(No Model.)
J. M. G. BONNET.
PROCESS OF RECOVERING TIN FROM WASTE TIN PLATE.
No. 459,034. Patented Sept. 8, 1891.
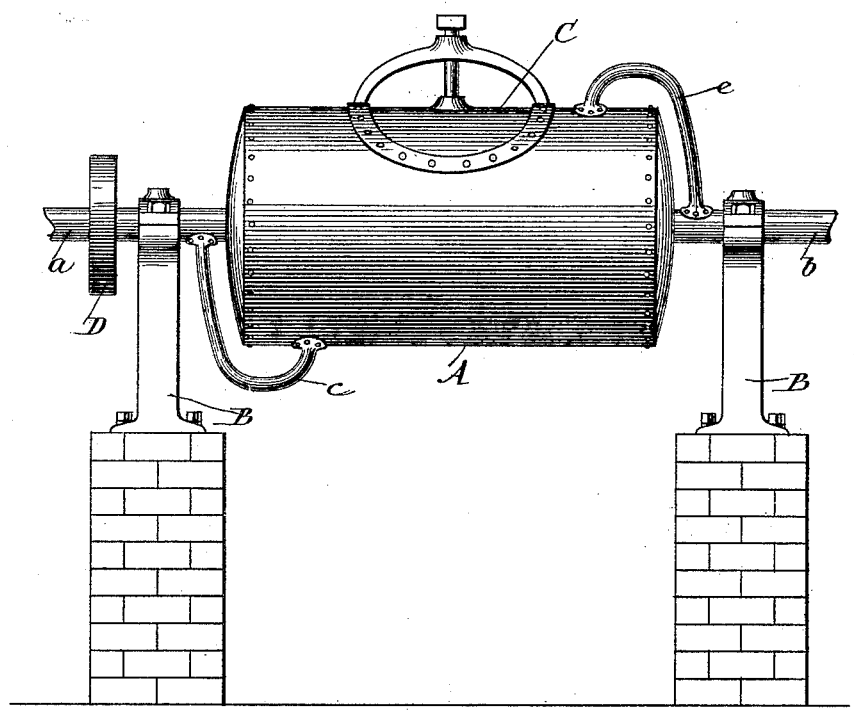

UNITED STATES PATENT OFFICE.

JEAN M. G. BONNET, OF PARIS, FRANCE, ASSIGNOR OF TWO-THIRDS TO F. MAURICE SALLINGER AND JOSEPH BERNHEIM, OF CHICAGO, ILLINOIS.

PROCESS OF RECOVERING TIN FROM WASTE TIN-PLATE.

SPECIFICATION forming part of Letters Patent No. 459,034, dated September 8, 1891.

Application filed June 17, 1890. Serial No. 355,788. (No model.)

*To all whom it may concern:*

Be it known that I, JEAN M. G. BONNET, a citizen of France, residing in the city of Paris, France, have invented a new, useful, and Improved Process for Recovering Tin from Waste Tin-Plate, of which the following is a specification, reference being had to the accompanying drawing, in which the figure is a side elevation.

The object of my invention is to provide an improved process for recovering tin from waste or scrap tin-plate, and may be used for recovering lead and similar metals from scrap metal. I accomplish this object by means of the process hereinafter described.

That which I claim as new will be pointed out in the claims.

In the drawing I have shown one form of apparatus; but various forms of apparatus may be used.

In the apparatus shown I employ a cylinder A, which is mounted upon trunnions $a$ and $b$. These trunnions $a$ and $b$ are supported in suitable bearings upon the frame-work B. The cylinder is provided with a charging or loading orifice C which is closed by means of a man-head. The trunnions $a$ and $b$ are tubular. The trunnion $a$ is connected with the cylinder A by a pipe $c$, and the trunnion $b$ is connected with the cylinder A by a pipe $e$. The scrap or waste tin-plate is placed in the cylinder A and the orifice C is closed. An alkaline solution is then run into the cylinder A at a temperature of about 250° Fahrenheit through one of the trunnions $a$ or $b$. I preferably employ a solution of caustic soda. Air previously heated to the temperature of about 250° Fahrenheit is then forced into the solution in the cylinder A. I then agitate the mass for a short time, preferably about half an hour, which I accomplish by rotating the cylinder by means of the pulley D on one of the trunnions. During this time the alkaline solution and the oxygen from the air will act upon the tin, forming stannate of soda, which remains in solution, while the iron of the tin-plate remains free of tin in the bottom of the cylinder. I then draw the solution from the cylinder A and separate the tin by introducing into the solution sulphurous acid, which precipitates the tin in the form of stannic acid, leaving sulphite of soda in solutution. When the scraps of tin-plate are varnished, the varnish may be cleaned off by the use of sodium carbonate.

The same process is applicable in recovering lead from plate metal, the lead forming plumbates, which can be treated in a similar manner.

The chief point of my process is the use of hot air in the presence of an alkali to act upon tin, forming stannates. Other alkalies may be used, such as potassium hydrate; but for various reasons caustic soda is preferable.

What I claim as my invention, and desire to secure by Letters Patent, is—

1. In the art of recovering tin from tin-plate, the process of forming stannates, which consists in agitating the plated metal in an alkaline solution and simultaneously forcing hot air into said solution, thereby subjecting the plated metal to the action of heated oxygen in the presence of an alkili, substantially as and for the purpose specified.

2. The process of recovering tin and lead from sheet metal, which consists in agitating the metal in an alkaline solution and simultaneously forcing hot air into said solution, thereby forming stannates and plumbates, and then precipitating tin or lead from the stannates or plumbates by sulphurous acid, substantially as and for the purposes specified.

JEAN M. G. BONNET.

Witnesses:
HARRY T. JONES,
JOHN L. JACKSON.